(12) United States Patent
Geslin et al.

(10) Patent No.: US 7,648,170 B2
(45) Date of Patent: Jan. 19, 2010

(54) INTERCHANGEABLE SUSPENSION SYSTEM

(75) Inventors: Mathieu M. Geslin, Playa Vista, CA (US); Michael D. Donovan, Long Beach, CA (US); Charles Eddy, Palos Verdes, CA (US)

(73) Assignee: Honda Motor Co., Ltd., Tokyo (JP)

( * ) Notice: Subject to any disclaimer, the term of this patent is extended or adjusted under 35 U.S.C. 154(b) by 414 days.

(21) Appl. No.: 11/465,046

(22) Filed: Aug. 16, 2006

(65) Prior Publication Data

US 2008/0042390 A1    Feb. 21, 2008

(51) Int. Cl.
*B62D 21/12* (2006.01)
(52) U.S. Cl. ..................................................... 280/785
(58) Field of Classification Search .................. 280/781, 280/785, 787, 124.134, 124.135, 124.146, 280/124.152
See application file for complete search history.

(56) References Cited

U.S. PATENT DOCUMENTS

| | | | |
|---|---|---|---|
| 2,743,112 A | 4/1956 | Lambert | |
| 3,022,846 A | 2/1962 | Thompson | |
| 3,035,849 A | 5/1962 | Groth | |
| 3,131,963 A | 5/1964 | Schilberg | |
| 4,106,807 A | 8/1978 | Sakurai | |
| 4,533,172 A * | 8/1985 | Oliver | 296/203.01 |
| 4,869,539 A | 9/1989 | Cassese | |
| 4,881,756 A * | 11/1989 | Kumasaka et al. | 280/785 |
| 5,240,279 A | 8/1993 | Kunert | |
| 5,401,056 A | 3/1995 | Eastman | |
| 5,495,905 A | 3/1996 | Fini, Jr. | |
| 5,833,269 A * | 11/1998 | Gastesi | 280/785 |
| 6,896,319 B1 | 5/2005 | Huang et al. | |
| 7,306,069 B2 * | 12/2007 | Takeshima et al. | 180/312 |

* cited by examiner

*Primary Examiner*—Faye M. Fleming
(74) *Attorney, Agent, or Firm*—Plumsea Law Group, LLC; Mark E. Duell

(57) ABSTRACT

A vehicle with an interchangeable suspension system is disclosed. The vehicle includes a forward section with a forward suspension system and a rear section with a rear suspension system. Different forward and rear sections having different suspension systems can be selected and interchangeably attached to a central section. This arrangement allows rapid alteration of a vehicle.

25 Claims, 10 Drawing Sheets

INTERCHANGEABLE SUSPENSION SYSTEM

BACKGROUND OF THE INVENTION

1. Field of the Invention

The present invention relates generally to vehicles, and in particular an interchangeable suspension system for vehicles.

2. Description of Related Art

Vehicles can include some kind of suspension system. The suspension system generally connects the body or chassis to the wheels. Suspension systems can be tuned to provide ride comfort, improved handling and road feel or a combination of these attributes. Suspension systems can also be tuned to improve vehicle performance. Generally, suspension tuning amounts to selecting the correct bushings, setting ride height, setting spring and damping rates, and selecting wheels and tires. While tuning a suspension can improve the performance of the suspension within its performance envelope, radical changes to suspension systems are generally not possible.

Huang et al. (U.S. Pat. No. 6,896,319) discloses a modular body system. The modular body system of Huang is generally directed to a unibody construction and is intended for permanent assembly. The modules are not detachable after assembly. This system does not facilitate easy and rapid changes to a suspension system.

Oliver (U.S. Pat. No. 4,533,172) discloses a disconnectable automotive vehicle frame. The frame of Oliver includes low cost front and rear sections that can be replaced in the event of a collision. Oliver does not disclose or teach an interchangeable suspension system, nor does Oliver teach a system that allows rapid and radical suspension system changes. The frame proposed by Oliver would be difficult to disassemble because the front unit 30 is designed to support the engine on transverse channel 34.

Thompson (U.S. Pat. No. 3,022,846) teaches a miniature motor vehicle with a two-part frame. This arrangement allows for the substitution of the rear frame 11, and a different rear frame with a larger engine and larger rear tires can be used instead of the original rear frame. Thompson, however, fails to teach an interchangeable forward section, and Thompson also fails to teach an interchangeable suspension system.

While the related art proposes various chassis modifications and modular chassis assemblies, the related art fails to teach an interchangeable suspension system that can be rapidly modified.

SUMMARY OF THE INVENTION

A vehicle with an interchangeable suspension system is disclosed. In one aspect, the invention provides a vehicle comprising: a frame including a central section configured to accommodate a driver; a forward section disposed forward of the central section; a rear section connected to the central section and disposed opposite the forward section; the forward section including a first mounting point corresponding to a mounting location disposed on the central section; and the mounting point configured to receive a releasable fastener.

In another aspect, the forward section includes an associated first suspension system.

In another aspect, the second forward section includes a second suspension system different than the first suspension system.

In another aspect, the first suspension system is an independent suspension system.

In another aspect, the second suspension system is a rigid axle suspension system.

In another aspect, a second forward section is provided, wherein the second forward section includes a second mounting point corresponding to the mounting location disposed on the central section.

In another aspect, the rear section can be interchanged with a compatible second rear section.

In another aspect, the invention provides a vehicle comprising: a frame having a central section; a forward section associated with the frame at a forward end; a rear section associated with the frame at a rearward end; and where the forward section is releasably joined to the central section and the rear section is releasably joined to the central section.

In another aspect, the central section includes a forward mounting location that corresponds with a mounting point associated with the forward section.

In another aspect, a second forward section includes a second mounting location that corresponds with the forward mounting location of the central section.

In another aspect, the central section includes a rear mounting location that corresponds with a rear mounting point associated with the rear section.

In another aspect, a second rear section includes a second rear point that corresponds with the rear mounting location of the central section.

In another aspect, the front section includes an independent suspension system and wherein the rear section includes an independent suspension system.

In another aspect, the front section includes a rigid axle suspension and the rear section includes a rigid axle suspension system.

In another aspect, the invention provides a method of altering the handling characteristics of a vehicle comprising the steps of: selecting a selected forward section including a forward suspension system from a group of candidate forward sections; selecting a selected rear section including a rear suspension system from a group of candidate rear sections; associating the selected forward section with a central section; and associating the selected rear section with the central section.

In another aspect, candidate front sections within the group of candidate forward sections each have different front suspension systems.

In another aspect, candidate rear sections within the group of candidate rear sections each have different rear suspension systems.

In another aspect, a first candidate front suspension system includes an independent suspension system.

In another aspect, a second candidate front suspension system includes a rigid axle suspension system.

In another aspect, the central section includes a forward mounting location that is compatible with every candidate forward section and the central section includes a rear mounting location that is compatible with every candidate rear section.

In another aspect, the invention provides a vehicle comprising: a frame having a central section; a forward section associated with the central section at a forward end of the central section; the forward section being releasably joined to the central section at a universal mounting location configured to receive any compatible candidate forward section; the forward section including a forward frame; each side of the forward frame having a suspension system including an upper A-arm and a lower A-arm, wherein the inboard portions of the upper A-arm and the lower A-arm are connected to the forward frame, and wherein the outboard portions of the upper A-arm and the lower A-arm are connected to a hub, the hub including a brake disc and a wheel mounting portion; the suspension system also including a spring-damper device including a coil spring and a shock absorber; and the forward section also including a steering mechanism with steering links extending to each side, wherein the steering link is attached to a steering knuckle on the hub.

In another aspect, a rear section is associated with the frame at a rearward end; and wherein the rear section is releasably joined to the central section and the rear section is releasably joined to the central section at a universal mounting location configured to receive any compatible candidate rear section; the rear section including a rear frame; each side of the rear frame having a rear suspension system including an upper rear A-arm and a lower rear A-arm, wherein the inboard portions of the upper rear A-arm and the lower rear A-arm are connected to the forward frame, and wherein the outboard portions of the upper rear A-arm and the lower rear A-arm are connected to a rear hub, the rear hub including a rear brake disc and a rear wheel mounting portion; and the rear suspension system also including a rear spring-damper device including a rear coil spring and a rear shock absorber.

In another aspect, the invention provides a vehicle comprising: a frame having a central section; a forward section associated with the central section at a forward end of the central section; the forward section being releasably joined to the central section at a universal mounting location configured to receive any compatible candidate forward section; the forward section including a forward frame; the forward frame including a suspension system including an axle bar rigidly attached to the forward frame, wherein left and right ends of the axle bar include provisions to receive a rotating wheel; and the forward section also including a steering mechanism with steering links extending to each side, wherein the steering link is attached to a steering knuckle on the hub.

In another aspect, a rear section is associated with the frame at a rearward end; and wherein the rear section is releasably joined to the central section and the rear section is releasably joined to the central section at a universal mounting location configured to receive any compatible candidate rear section; the rear section including a rear frame; the rear frame including a rear suspension system including an rear axle bar rigidly attached to the rear frame, wherein left and right ends of the rear axle bar include provisions to receive a rotating wheel.

Other systems, methods, features and advantages of the invention will be, or will become apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION OF THE PREFERRED EMBODIMENTS

The invention can be used in connection with a vehicle. The term "vehicle" as used throughout the specification and claims refers to any moving vehicle that is capable of carrying one or more human occupants and is either powered by any form of energy or is unpowered and moved by gravity. The term vehicle includes, but is not limited to cars, trucks, vans, minivans, SUV's, motorcycles, scooters, boats, personal watercraft, and aircraft.

In some cases, the vehicle may include one or more engines. The term "engine" as used throughout the specification and claims refers to any device or machine that is capable of converting energy. In some cases, potential energy is converted to kinetic energy. For example, energy conversion can include a situation where the chemical potential energy of a fuel or fuel cell is converted into rotational kinetic energy or where electrical potential energy is converted into rotational kinetic energy. Engines can also include provisions for converting kinetic energy into potential energy, for example, some engines include regenerative braking systems where kinetic energy from a drivetrain is converted into potential energy. Engines can also include devices that convert solar or nuclear energy into another form of energy. Some examples of engines include, but are not limited to: internal combustion engines, electric motors, solar energy converters, turbines, nuclear power plants, and hybrid systems that combine two or more different types of energy conversion processes. In this specification, the term "power train" refers generally to an engine and a transmission.

Figure 1:
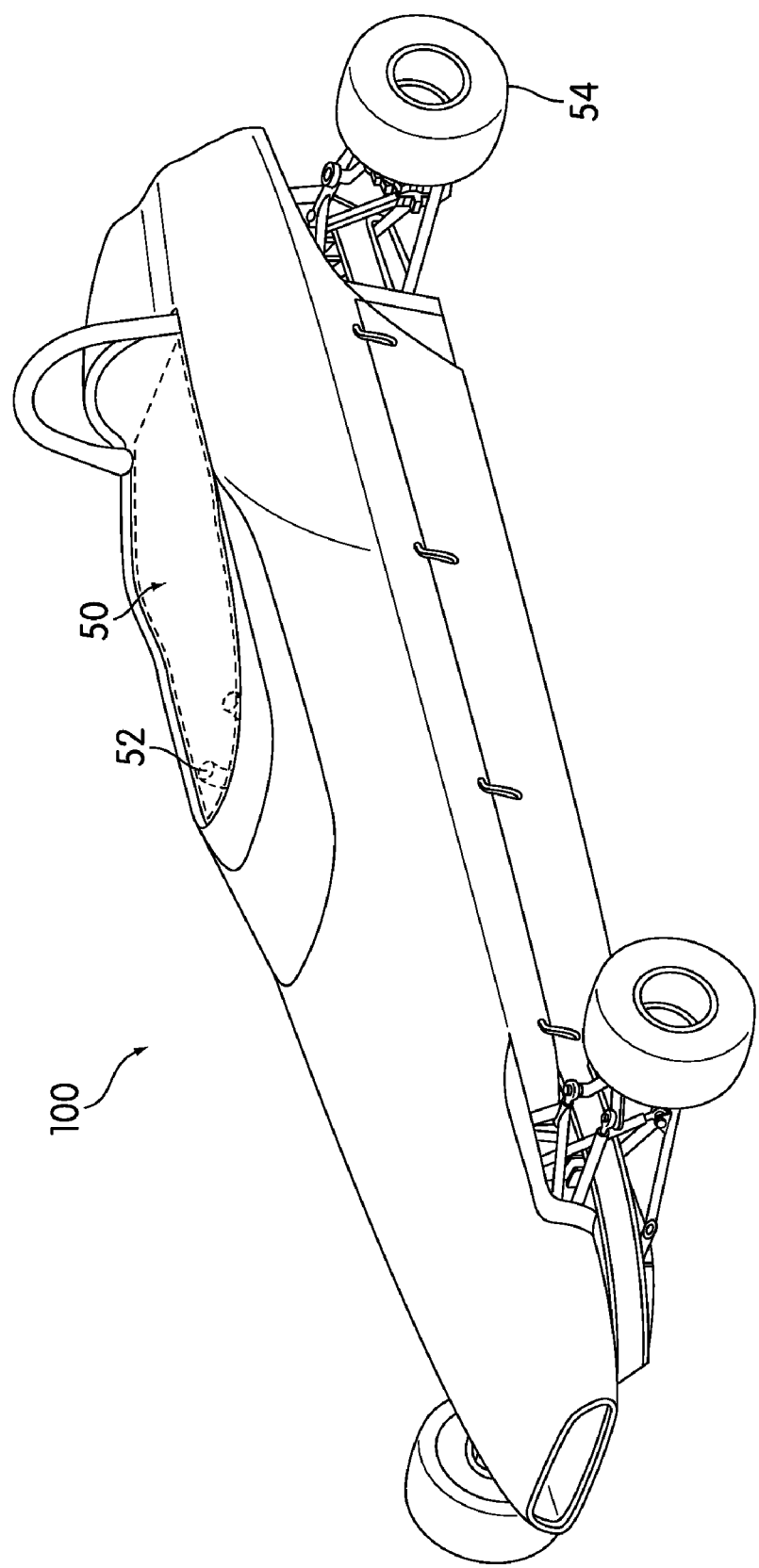
FIG. 1 is an perspective view of a preferred embodiment of a vehicle.

FIG. 1 is a preferred embodiment of a vehicle 100. Vehicle 100 includes a passenger compartment 50 configured to receive at least one passenger. Passenger compartment 50 can include a seat (not shown) and a steering device 52. Vehicle 100 also includes at least one wheel 54 designed to contact the ground.

Figure 2:
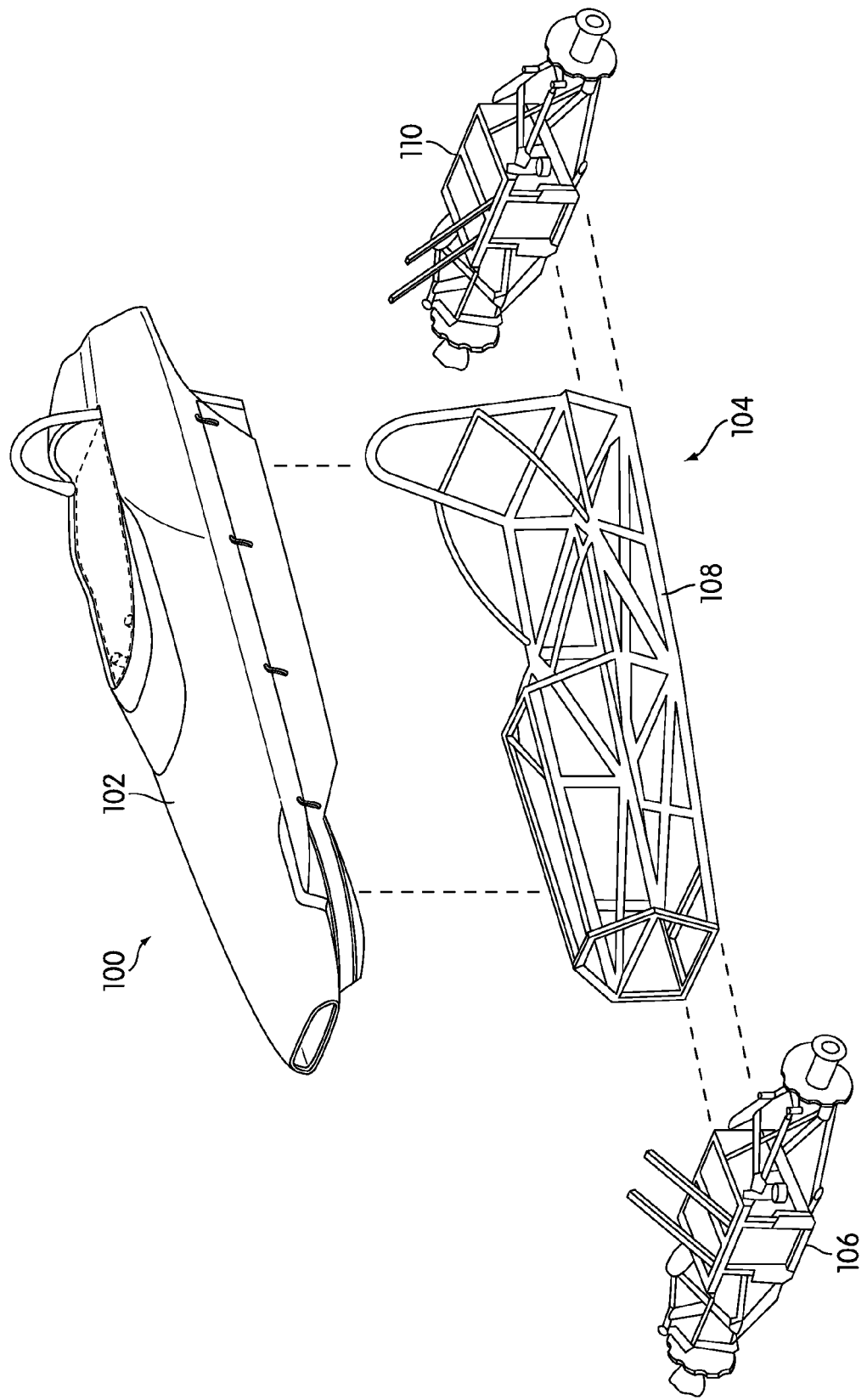
FIG. 2 is an exploded schematic diagram of a preferred embodiment of a vehicle and frame.

Referring to the FIG. 2, vehicle 100 preferably includes body 102 and frame 104. Frame 104 can be a tubular steel or aluminum frame. Other embodiments may use different arrangements of body on frame configurations. Additionally, alternative embodiments may use unibody construction. Any body or frame system can be used in connection with principles of the present interchangeable suspension system.

Frame 104 preferably includes three discrete sections, forward section 106, central section 108 and rear section 110. As shown in the Figures, forward section 106 is disposed forward of central section 108 and rear section 110 is disposed opposite forward section 106.

Preferably, front section 106 and rear section 110 are releasably joined to central section 108. The term "releasably joined" refers to an arrangement where one section can be quickly and easily attached and detached from another section using non-destructive techniques. Generally, releasably joined sections include releasable joints that can be attached and detached using readily available tools. Some examples of releasable joints include mechanical connectors, threaded fasteners, sliding mechanical joints, interlocking joints (for example, dovetail joints) and pressure couplings (for example, clamps and clips), among other kinds of releasable joints. An example of a non-releasable joint is a weld. Welds can be detached by cutting with a saw or blow torch, however, cutting is generally considered a destructive technique of detachment.

The use of releasably joined sections allows for the interchangeability of various components. Although any releasably joined component may be configured for easy attachment and detachment, preferably, forward section 106 releasably joined to center section 108. In some embodiments, multiple forward sections can be provided, and these different forward sections can include different characteristics. In preferred embodiments, the different forward sections include different suspension systems.

This allows the selection of a particular, selected suspension system among multiple candidate forward sections. Using this arrangement, the particular suspension layout of vehicle 100 can be very quickly altered or modified, even just prior to use. In some cases, where vehicle 100 is intended for use as a racing vehicle, the suspension layout of vehicle 100 can be changed on or very near race day to accommodate changing conditions.

Figure 3:
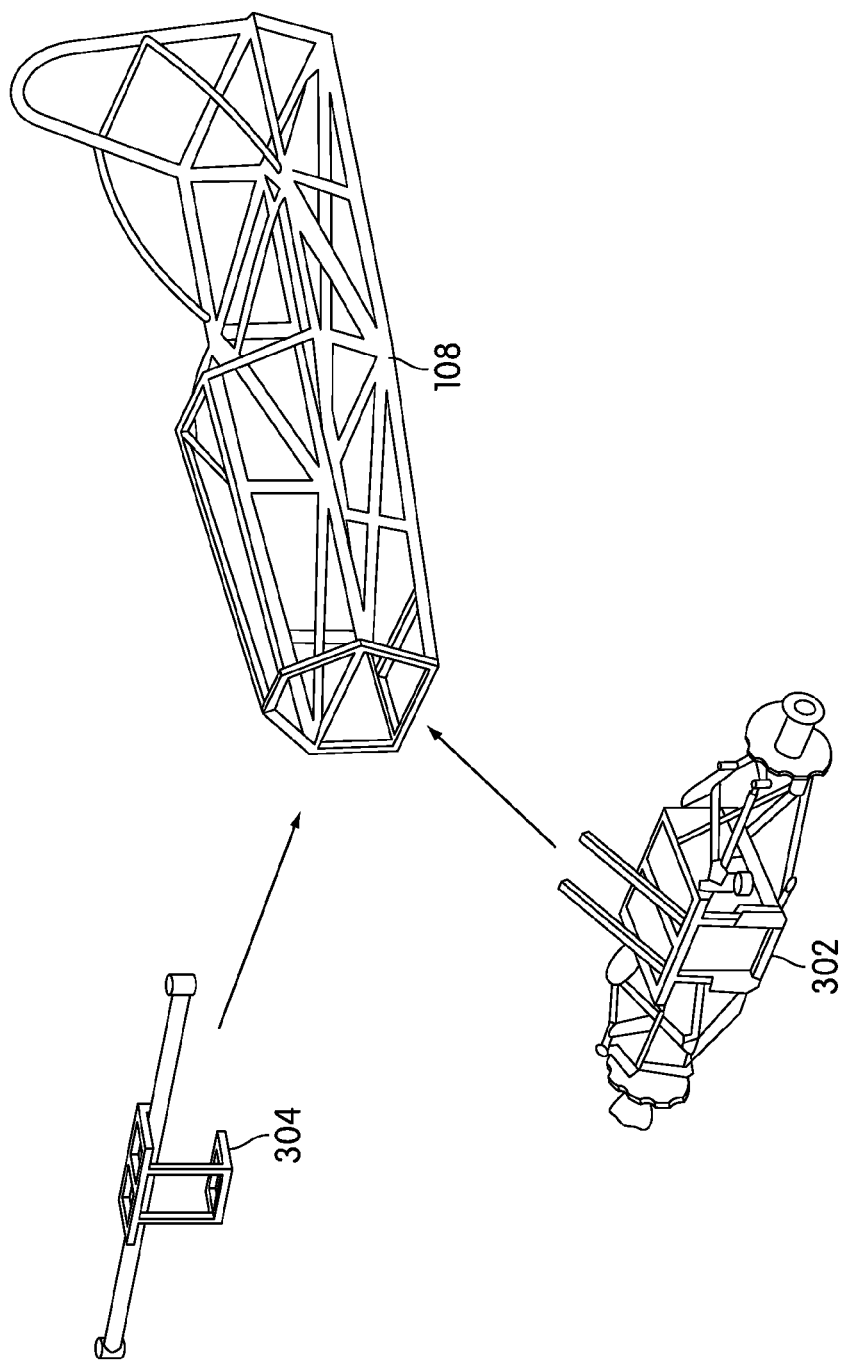
FIG. 3 is a schematic diagram of a preferred embodiment of a frame and candidate front sections.

Referring to FIG. 3, multiple candidate forward sections may be available. In the embodiment shown in FIG. 3, two candidate forward sections are available, first forward section 302 and second forward section 304. Of course other embodiments may include additional candidate forward sections. Preferably, each of the candidate forward sections includes an associated suspension system. In the embodiment shown in FIG. 3, first forward section 302 includes an independent suspension system, and second forward section 304 includes a rigid axle suspension system. One of the candidate forward sections can be selected that best suits the current driving conditions.

Figure 4:
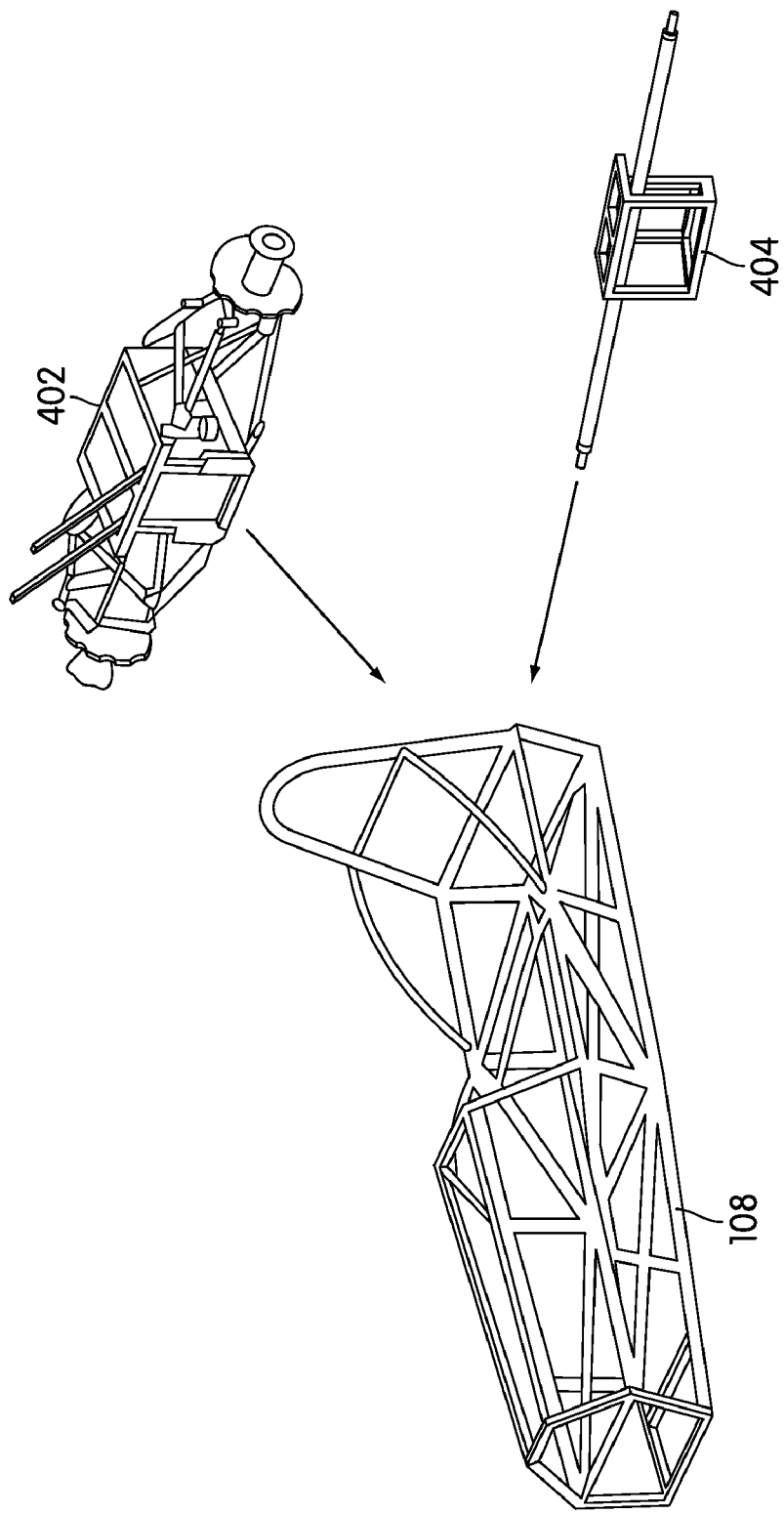
FIG. 4 is a schematic diagram of a preferred embodiment of a frame and candidate rear sections.

Similarly, referring to FIG. 4, multiple candidate rear sections may be provided. In the embodiment shown in FIG. 4, two candidate rear sections are available, first rear section 402 and second rear section 404. Of course other embodiments may include additional candidate rear sections. Preferably, each of the candidate rear sections includes an associated suspension system. In the embodiment shown in FIG. 4, first rear section 402 includes an independent suspension system, and second rear section 404 includes a rigid axle suspension system. One of the candidate rear sections can be selected that best suits the current driving conditions.

Figure 5:
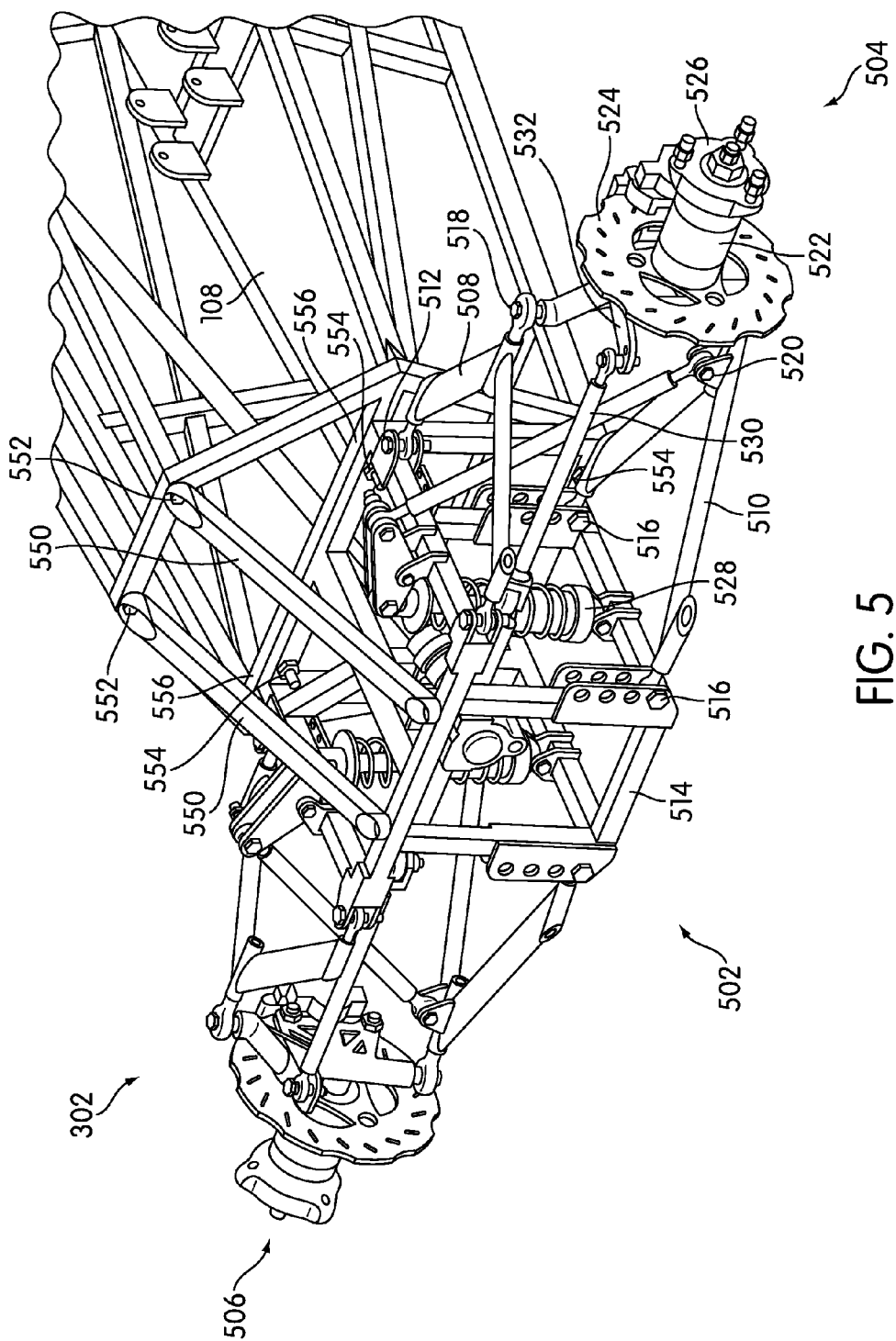
FIG. 5 is an enlarged schematic diagram of a preferred embodiment of a first front section.

FIG. 5 is an enlarged view of first front section 302. First front section includes an independent suspension system 502. Independent suspension system 502 includes substantially similar left and right sides. For clarity, only the left side 504 of independent suspension system 502 is disclosed in detail. However, the details of the left side 504 are applicable to the right side 506 as well.

Left side 504 includes an upper A-arm 508 and a lower A-arm 510. The inboard links 512 of upper A-arm 508 are mounted to an upper portion forward frame 514. Similarly, the inboard links 516 of lower A-arm 510 are also mounted to forward frame 514. The outboard link 518 of upper A-arm 508 and the outboard link 520 of lower A-arm 510 are both mounted to hub 522. Hub 522 also includes brake disc 524 and wheel mount portion 526, which is configured to receive a wheel (not shown). Left side 504 can also include spring-damper device 528. In some embodiments, spring-damper device 528 can include a coil spring and/or a shock absorber. To provide steering control, left side 504 can include steering link 530, which can be attached to steering knuckle 532 extending from hub 522. Right side 506 of independent suspension system 502 includes similar structural elements.

First front section 302 preferably includes provisions that assist in releasably joining first front section 302 with central section 108. In a preferred embodiment, first front section 302 is attached to central section 108 with the use of releasable fasteners. Referring to FIG. 5, which is an exemplary embodiment of first front section 302, the mounting arrangement of first front section 302 can be observed.

First front section 302 preferably includes one or more reinforcement arms 550 having rearward ends 552. Preferably, rearward ends 552 include provisions to receive threaded fasteners, which can be used to join rearward ends 552 to central section 108. First front section 302 also preferably includes additional mounting points 554.

Any desired number of mounting points 554 may be used. Mounting points 554 coincide with corresponding mounting locations 556 in central section 108. The various mounting points 554 and mounting locations 556 can include threads configured to receive threaded fasteners, or can include holes configured to receive bolts. In some cases, one or more of the mounting points 554 include bushings or other kinds of vibration dampers.

Generally, other front sections, for example, second forward section 304 preferably include mounting points similar to the mounting points 554 of first front section 302. This allows other front sections to attach to the same mounting locations 556 of central section 108. Using this arrangement, any number of compatibly designed front ends can mate with central section 108 allowing multiple different front end designs and front suspension configurations. This arrangement also allows rapid attachment and removal of any front section with central section 108.

Figure 6:
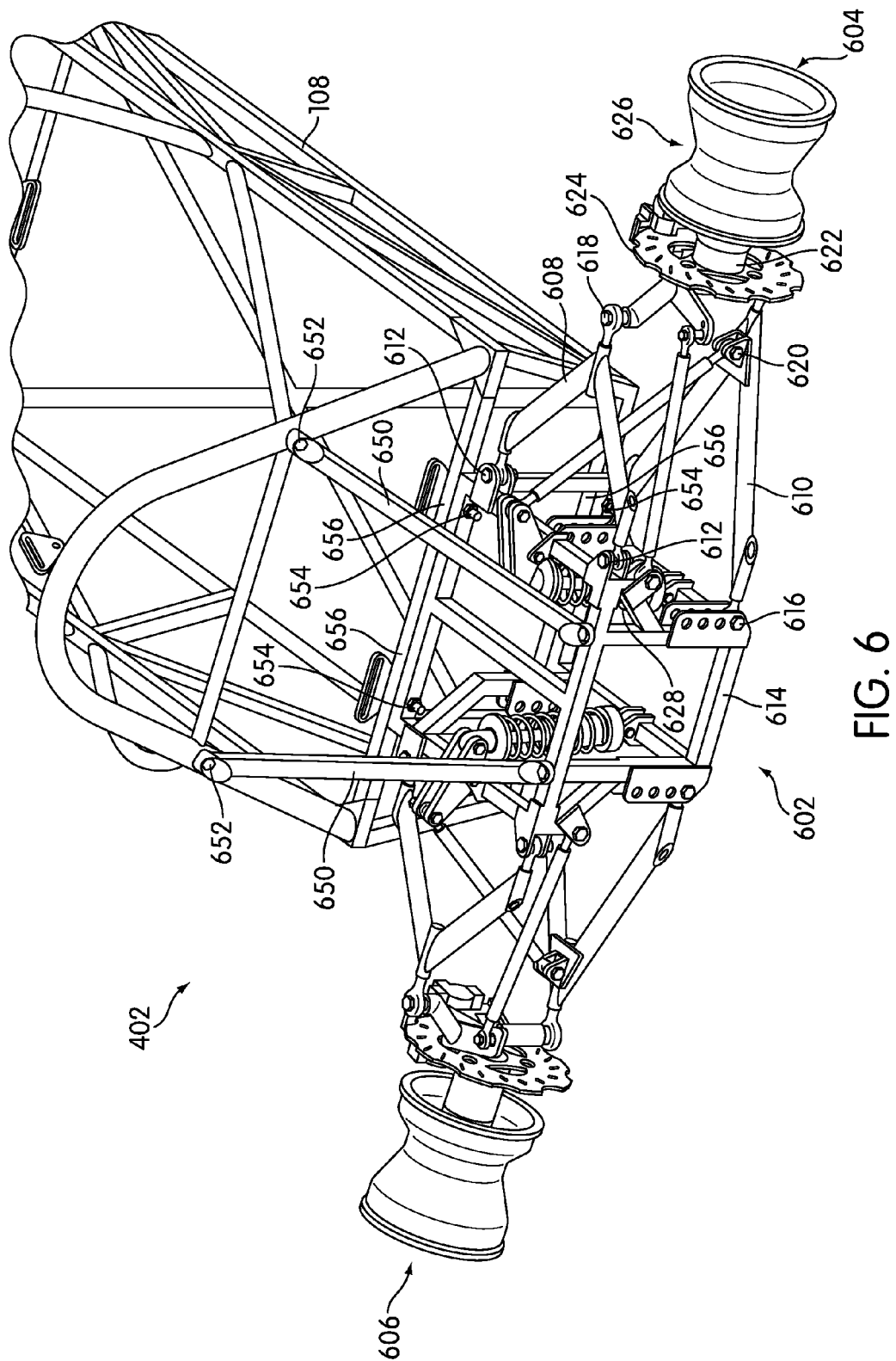
FIG. 6 is an enlarged schematic diagram of a preferred embodiment of a first rear section.

FIG. 6 is an enlarged view of first rear section 402. First rear section includes an independent suspension system 602. Independent suspension system 602 includes substantially similar left and right sides. For clarity, only the right side 604 of independent suspension system 602 is disclosed in detail. However, the details of the right side 604 are applicable to the left side 606 as well.

Right side 604 includes an upper A-arm 608 and a lower A-arm 610. The inboard links 612 of upper A-arm 608 are mounted to an upper portion rear frame 614. Similarly, the inboard links 616 of lower A-arm 610 are also mounted to rear frame 614. The outboard link 618 of upper A-arm 608 and the outboard link 620 of lower A-arm 610 are both mounted to hub 622. Hub 622 also includes brake disc 624 and wheel mount portion 626, which is configured to receive a wheel (not shown). Right side 604 can also include spring-damper device 628. In some embodiments, spring-damper device 628 can include a coil spring and/or a shock absorber. Left side 606 of independent suspension system 602 preferably includes similar structural elements.

First rear section 402 preferably includes provisions that assist in releasably joining first rear section 402 with central section 108. In a preferred embodiment, first rear section 402 is attached to central section 108 with the use of releasable fasteners. Referring to FIG. 6, which is an exemplary embodiment of first rear section 402, the mounting arrangement of first rear section 402 can be observed.

First rear section 402 preferably includes one or more reinforcement arms 650 having forward ends 652. Preferably, forward ends 652 include provisions to receive threaded fasteners, which can be used to join forward ends 652 to central section 108. First rear section 402 also preferably includes additional mounting points 654.

Any desired number of mounting points 654 may be used. Mounting points 654 coincide with corresponding rear mounting locations 656 in central section 108. The various mounting points 654 and rear mounting locations 656 can include threads configured to receive threaded fasteners, or can include holes configured to receive bolts. In some cases, one or more of the mounting points 654 include bushings or other kinds of vibration dampers.

Generally, other front sections, for example, second rear section 404, preferably include mounting points similar to the mounting points 654 of first rear section 402. This allows other rear sections to attach to the same rear mounting locations 656 of central section 108. Using this arrangement, any number of compatibly designed front ends can mate with central section 108 allowing multiple different front end designs and front suspension configurations. This arrangement also allows rapid attachment and removal of any front section with central section 108.

Figure 7:
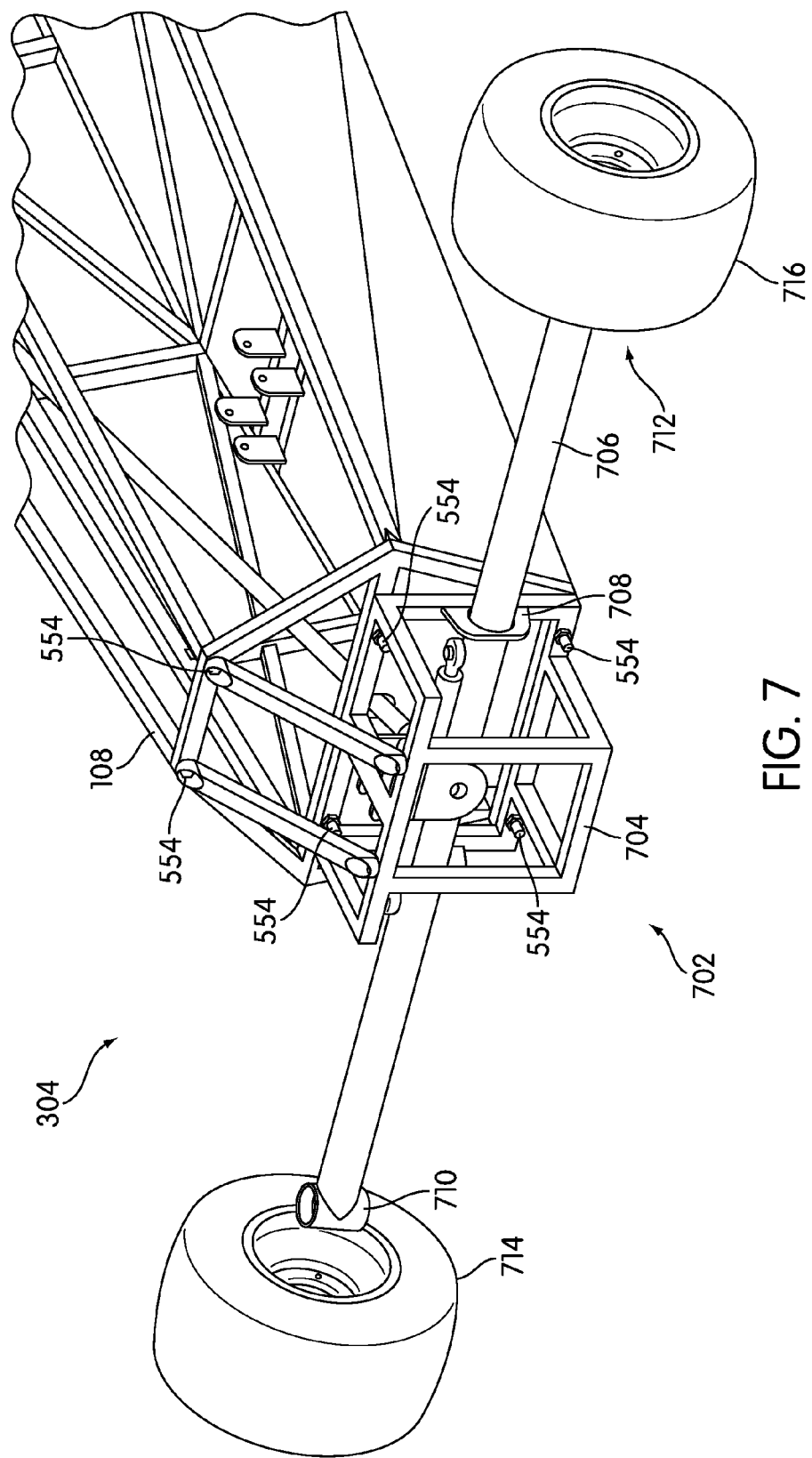
FIG. 7 is an enlarged schematic diagram of a preferred embodiment of a second front section.

FIG. 7 is an enlarged view of a preferred embodiment of second front section 304. Second forward section 304 preferably includes a rigid axle suspension system 702. Axle bar 706 is attached to second forward frame 704 by one or more flanges 708 that extend from second forward frame 704. In the embodiment shown in FIG. 7, axle bar 706 is rigidly attached to second forward frame 704 and is not designed to rotate with respect to second forward frame 704. However, in alternative embodiments, axle bar 706 may be designed to rotate with respect to second forward frame 704. In those embodiments where axle bar 706 is designed to rotate with respect to second forward frame 704, suitable bearings may be provided to accommodate the rotation of axle bar 706.

Axle bar 706 preferably extends outward in both the left and right directions, terminating in right bar end 710 and left bar end 712. Preferably, both right bar end 710 and left bar end 712 include provisions to receive and mount a rotating wheel. Preferably, a conventional hub and bearing assembly is used to receive respective right and left wheels 714 and 716. Second forward frame 704 also preferably includes a conventional steering system similar to the steering linkage shown in FIG. 5.

As disclosed above, second forward section 304 preferably includes mounting points compatible with the mounting points 554 of first forward section 302. It should be noted that a total of six mounting points 554 are shown in FIG. 7. Two mounting points 554 associated with second reinforcement arms 750 and four mounting points 554 associated with second forward frame 704. First forward section 302 includes mounting points 554 in similar locations, but because of the mechanical complexity of independent suspension system 502, some mounting locations 554 may be difficult to see in FIG. 5. This common or universal mounting system allows second forward section 304 to interchangeably mate with the forward mounting locations 556 of central section 108.

Figure 8:
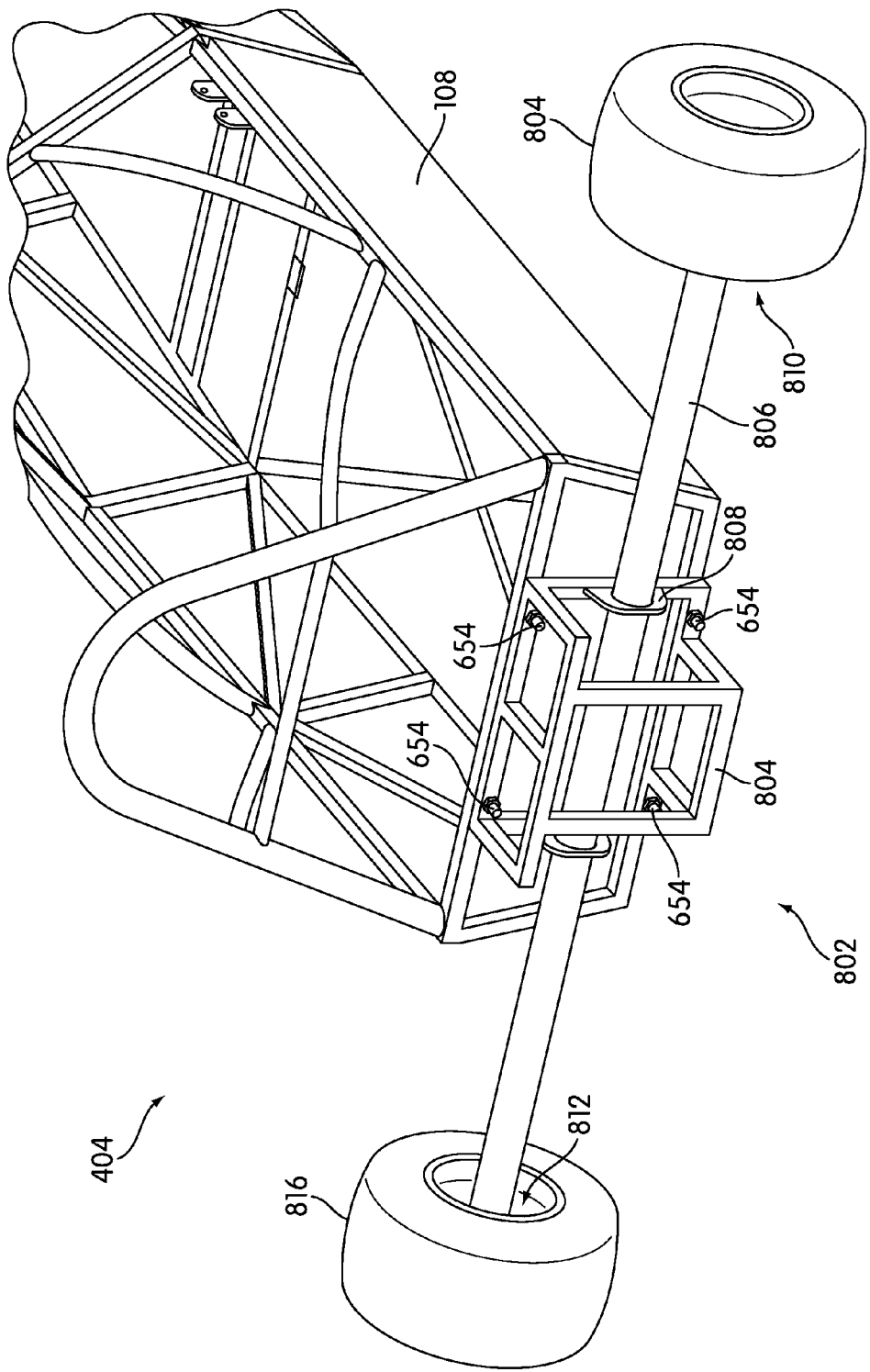
FIG. 8 is an enlarged schematic diagram of a preferred embodiment of a second rear section.

FIG. 8 is an enlarged view of a preferred embodiment of second rear section 404. Second rear section 404 preferably includes a rigid axle suspension system 802. Rear axle bar 806 is attached to second rear frame 804 by one or more flanges 808 that extend from second rear frame 804. In the embodiment shown in FIG. 8, rear axle bar 806 is rigidly attached to second rear frame 804 and is not designed to rotate with respect to second rear frame 704. However, in alternative embodiments, rear axle bar 806 may be designed to rotate with respect to second rear frame 804. In those embodiments where rear axle bar 806 is designed to rotate with respect to second rear frame 804, suitable bearings may be provided to accommodate the rotation of rear axle bar 806.

Rear axle bar 806 preferably extends outward in both the left and right directions, terminating in right rear bar end 810 and left rear bar end 812. Preferably, both right rear bar end 810 and left bar end 812 include provisions to receive and mount a rotating wheel. Preferably, a conventional hub and bearing assembly is used to receive respective right and left wheels 814 and 816.

As disclosed above, second rear section 404 preferably includes rear mounting points compatible with the rear mounting points 654 of first rear section 304. It should be noted that a total of four mounting points 654 are shown in FIG. 8. The four mounting points 654 are associated with second rear frame 804. In the embodiment shown in FIG. 8, rear reinforcement arms are not used. However, some alternative embodiments do include rear reinforcement arms.

First rear section 304 includes mounting points 654 in similar locations, but because of the mechanical complexity of rear independent suspension system 602, some mounting locations 654 may be difficult to see in FIG. 6. This common or universal mounting system allows second rear section 404 to interchangeably mate with the rear mounting locations 656 of central section 108.

Figure 9:
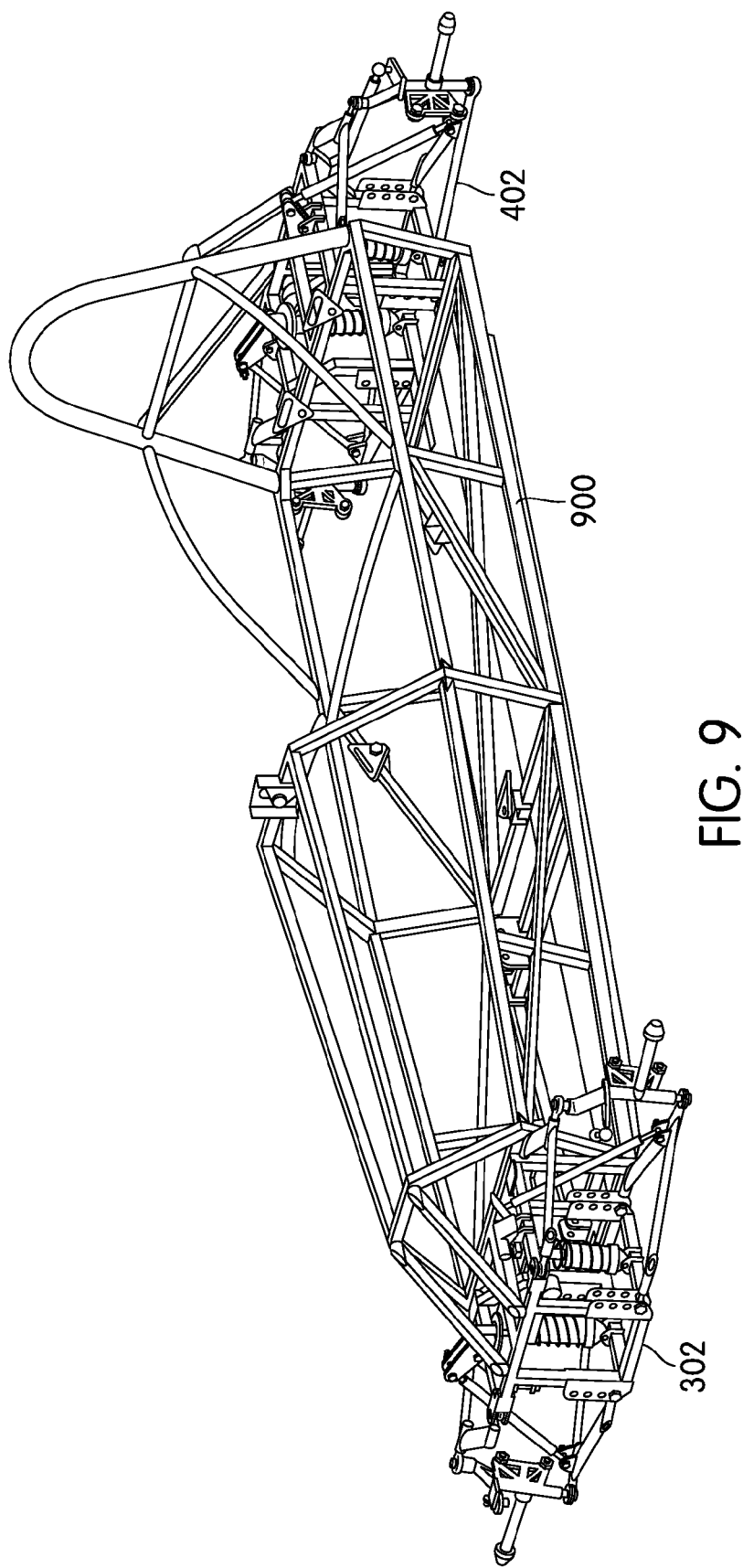
FIG. 9 is a schematic diagram of a preferred embodiment of a possible frame configuration.
Figure 10:
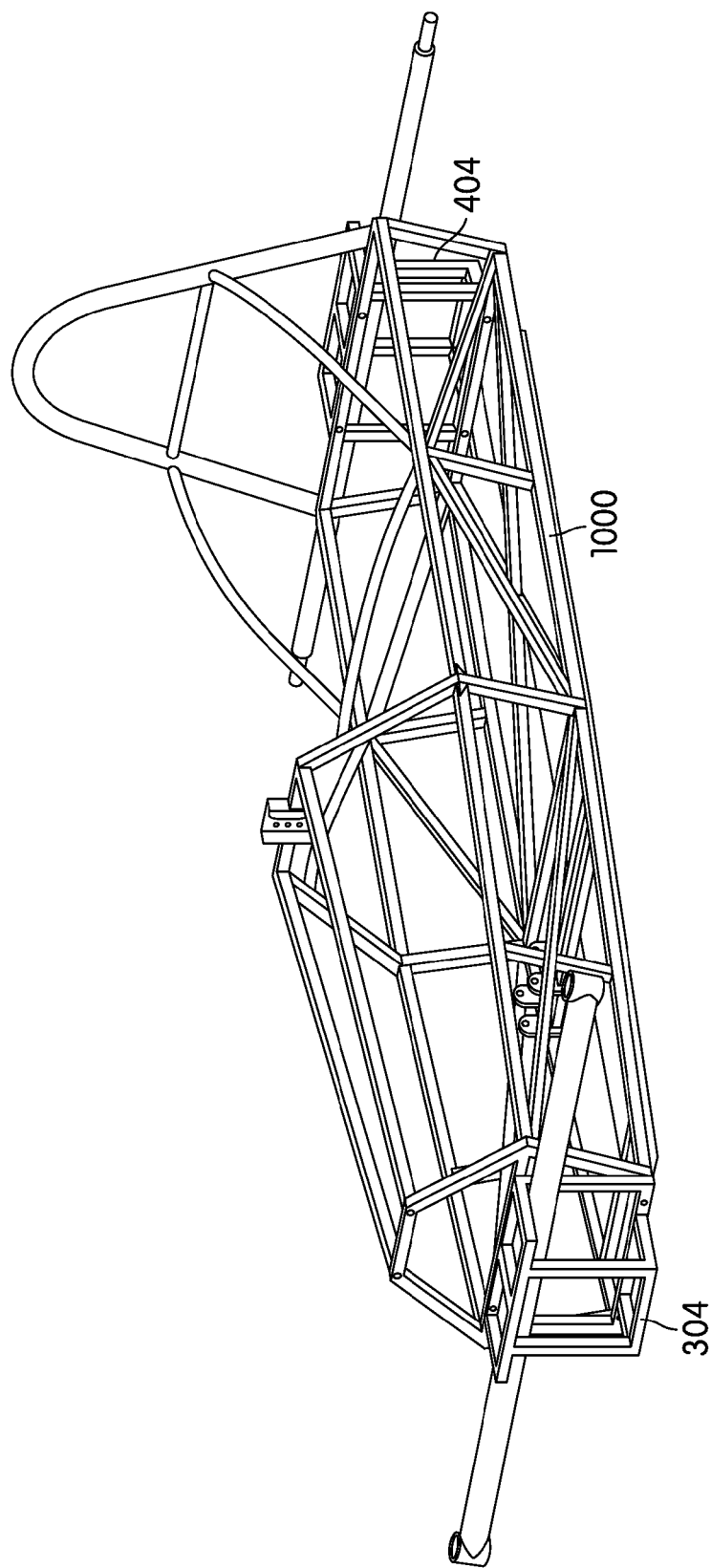
FIG. 10 is a schematic diagram of a preferred embodiment of an alternative frame configuration.

FIG. 9 is a schematic diagram of first frame configuration 900 including first forward section 302 and first rear section 402. FIG. 10 is a schematic diagram of second frame configuration 1000 including second forward section 304 and second rear section 404. By using principles of the present invention, it is possible to rapidly change the configuration of a vehicle from first frame configuration 900 to second frame configuration 1000. It is also possible to use different kinds of frames and suspension systems for the forward section and the rear section. In other words, it is possible to provide a frame configuration with an independent suspension disposed on the forward section, and a rigid axle suspension disposed on the rear section. Other configurations are also possible, and any configuration can be easily created using the interchangeable suspension system according to the invention.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A vehicle comprising:
    a frame including a central section configured to accommodate a driver;
    a first forward section disposed opposite the forward section, wherein the first forward section includes an associated first forward suspension system;
    a first rear section connected to the central section and disposed opposite the forward section, wherein the first rear section includes an associated first rear suspension system;
    the first forward section including a first mounting point corresponding to a mounting location disposed on the central section, wherein the mounting location is universal and configured to receive any number of compatible candidate forward sections;
    the mounting point configured to receive a releasable fastener; and wherein a second forward section is provided that includes a second forward suspension system different than the first forward suspension system, wherein a second rear section is provided that includes a second rear suspension system different than the first rear suspension system.

2. The vehicle according to claim 1, wherein the second forward section includes a second mounting point corresponding to the mounting location disposed on the central section.

3. The vehicle according to claim 2, wherein the first mounting point of the first forward section is compatible with the second mounting point of the second forward section.

4. The vehicle according to claim 1, wherein the first suspension system is an independent suspension system.

5. The vehicle according to claim 1, wherein the second suspension system is a rigid axle suspension system.

6. The vehicle according to claim 1, wherein the first rear section includes an associated first suspension system.

7. The vehicle according to claim 6, wherein the first rear section can be interchanged with a compatible second rear section, wherein the second rear section includes a second suspension system that is different from the first suspension system of the first rear section.

8. A vehicle comprising:
a frame having a central section which includes a forward mounting location and a rear mounting location;
a first forward section associated with the frame at a forward end, wherein the first forward section includes a mounting point associated therewith which corresponds to the forward mounting location of the central section;
a first rear section associated with the frame at a rearward end, wherein the first rear section includes a mounting point associated therewith which corresponds to the rearward mounting location of the central section;
wherein the first forward section is releasably joined to the central section and the first rear section is releasably joined to the central section; and
wherein a second forward section and a second rear section each include a second mounting location that corresponds with the forward mounting location and the rear mounting location, respectively, of the central section.

9. The vehicle according to claim 8, wherein the first mounting point of the first forward section is compatible with the second mounting point of the second forward section.

10. The vehicle according to claim 8, wherein the first mounting point of the first rear section is compatible with the second mounting point of the second rear section.

11. The vehicle according to claim 8, wherein the mounting points of the forward sections and the mounting points of the rear sections are the same.

12. The vehicle according to claim 8, wherein the mounting points of the forward sections and the rear sections are threaded fasteners.

13. The vehicle according to claim 8, wherein the front section includes an independent suspension system and wherein the rear section includes an independent suspension system.

14. The vehicle according to claim 8, wherein the front section includes a rigid axle suspension and the rear section includes a rigid axle suspension system.

15. A method of altering the handling characteristics of a vehicle comprising the steps of:
selecting a selected forward section including a forward suspension system from a group of candidate forward sections, wherein candidate forward sections within the group of candidate forward sections each have different forward suspension systems;
selecting a selected rear section including a rear suspension system from a group of candidate rear sections, wherein candidate rear sections within the group of candidate rear sections each have different rear suspension systems;
associating the selected forward section with a central section; and
associating the selected rear section with the central section.

16. The method according to claim 15, wherein a first candidate rear suspension system includes an independent suspension system.

17. The method according to claim 16, wherein a second candidate rear suspension system includes a rigid axle suspension system.

18. The method according to claim 15, wherein a first candidate forward suspension system includes an independent suspension system.

19. The method according to claim 18, wherein a second candidate forward suspension system includes a rigid axle suspension system.

20. The method according to claim 15, wherein the central section includes a forward mounting location that is compatible with every candidate forward section and the central section includes a rear mounting location that is compatible with every candidate rear section.

21. A vehicle comprising:
a frame having a central section;
a forward section associated with the central section at a forward end of the central section, wherein the forward section is selected from a group of candidate forward sections having more than one type of forward suspension system;
the selected forward section being releasably joined to the central section at a universal mounting location configured to receive any compatible candidate forward section;
the selected forward section including a forward frame with one type of forward suspension system being included on each of two sides of the forward frame, wherein the forward suspension system includes an upper A-arm and a lower A-arm, wherein the inboard portions of the upper A-arm and the lower A-arm are connected to the forward frame, and wherein the outboard portions of the upper A-arm and the lower A-arm are connected to a hub, the hub including a brake disc and a wheel mounting portion;
the forward suspension system also including a spring-damper device including a coil spring and a shock absorber; and
the selected forward section also including a steering mechanism with steering links extending to each side, where the steering link is attached to a steering knuckle on the hub.

22. The vehicle according to claim 21, wherein a rear section is associated with the frame at a rearward end, wherein the rear section is selected from a group of candidate rear sections having more than one type of rear suspension system;
wherein the selected rear section is releasably joined to the central section at a universal mounting location configured to receive any compatible candidate rear section;
the selected rear section including a rear frame with one type of rear suspension system being included on each of two sides of the rear frame, wherein one type of rear suspension system includes an upper rear A-arm and a lower rear A-arm, wherein the inboard portions of the upper rear A-arm and the lower rear A-arm are connected to the forward frame, and wherein the outboard portions of the upper rear A-arm and the lower rear A-arm are connected to a rear hub, the rear hub including a rear brake disc and a rear wheel mounting portion; and the rear suspension system also including a rear spring-damper device including a rear coil spring and a rear shock absorber.

23. A vehicle comprising:

a frame having a central section;

a forward section associated with the central section at a forward end of the central section, wherein the forward section is selected from a group of forward sections having more than one type of suspension system;

a rear section associated with the central section at a rearward end, wherein the rear section is selected from a group of rear sections having more than one type of suspension system;

the selected forward section and the selected rear section being releasably joined to the central section at a universal mounting location configured to receive any compatible candidate forward section;

the selected forward section including a forward frame;

the forward frame including one type of rear suspension system which includes an axle bar rigidly attached to the forward frame, wherein left and right ends of the axle bar include provisions to receive a rotating wheel; and the selected forward section also including a steering mechanism with steering links extending to each side, wherein the steering link is attached to a steering knuckle on the hub.

24. The vehicle according to claim 23, wherein the selected rear section is releasably joined to the central section at a universal mounting location configured to receive any compatible candidate rear section;

the selected rear section including a rear frame;

the rear frame including one type of rear suspension system which includes a rear axle bar rigidly attached to the rear frame, wherein left and right ends of the rear axle bar include provisions to receive a rotating wheel.

25. A vehicle comprising:

a frame including a central section configured to accommodate a driver;

a forward section disposed forward of the central section, wherein the forward section is selected from a group of forward sections having more than one type of suspension system, wherein the forward section includes a first universal mount configuration for receiving a suspension system;

a rear section connected to the central section and disposed opposite the forward section, wherein the rear section is selected from a group of rear sections having more than one type of suspension system, wherein the rear section includes a second universal mount configuration for receiving a suspension system; and wherein the first and the second universal mount configurations are the same.

* * * * *